Aug. 3, 1965  L. ERDELY  3,198,013
PRESSURE GAGE
Filed Oct. 5, 1961
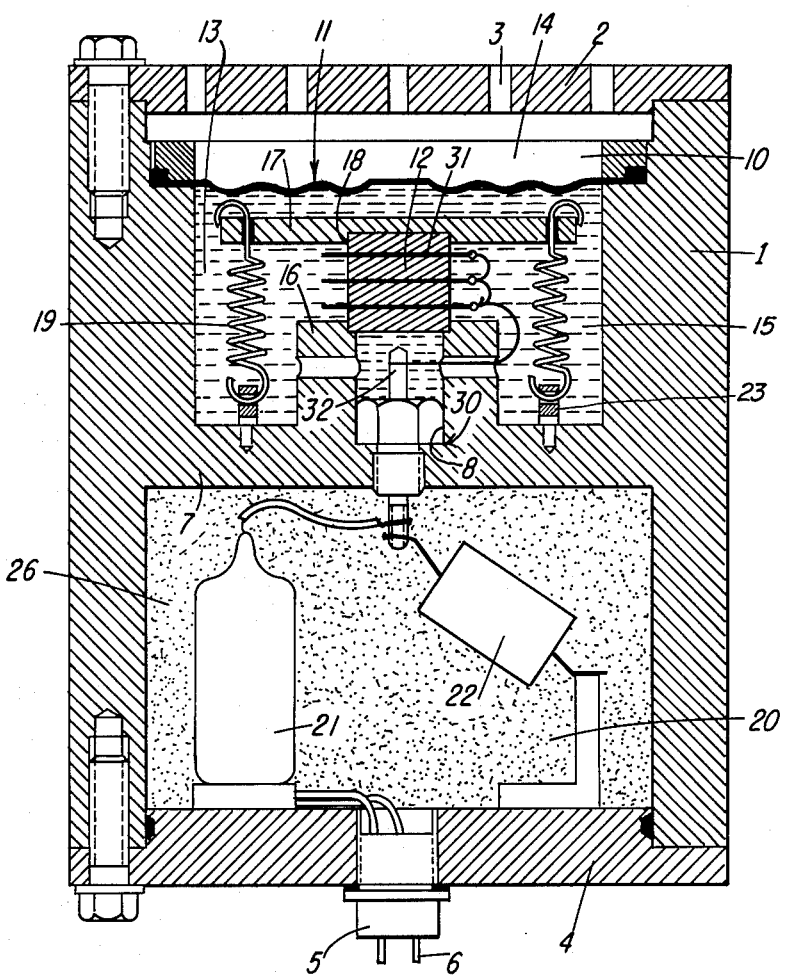
INVENTOR.
LADISLAS ERDELY pressure waves produced by the ocean conditions noted. The above described instrument can be immersed into the oceans or seas at a depth sufficient to accurately measure the so-called second term effect.

United States Patent Office 3,198,013
Patented Aug. 3, 1965

3,198,013
PRESSURE GAGE
Ladislas Erdely, Paris, France, assignor to
Pechiney, Paris, France
Filed Oct. 5, 1961, Ser. No. 143,193
3 Claims. (Cl. 73—398)

This invention relates to a pressure gage of high sensitivity, and it relates more particularly to an instrument which is adapted to precisely detect and record small pressures and small pressure variations.

The apparatus of this invention has for one of its uses the detection and measurement of the forces which generate microseisms. The small earth tremors known as microseisms are detected and recorded by siesmographs and the recorded impressions have irregular and momentary characteristics. Some authorities believe that microseisms are evidence of a hammering effect on the ocean floor. The hammering effect is believed to be a so-called second term effect which is inherent in the chopping which occurs at particular times and places on the ocean surface. It is of interest to science to be able to measure the forces generated in such instances in order to determine the correctness of various theories which have been proposed. By measuring the various factors and characteristics of this phenomenon it is possible that meteorological information could be acquired which could be used to explain disturbances occurring in areas remote from the point of measurement of the microseism.

It is well known that certain crystals are possessed of piezoelectric properties. Specifically, such crystals when subjected to an isotropic or anisotropic pressure in relation to their piezoelectric axes generate an electromotive force which is at a maximum between the planes of the crystals crossed by these axes. It has been attempted to transmit by mechanical means a force along these axes and to use the resulting electromotive force as a measure of the mechanical force. The use of a mechanical agent in a test of this type has not been satisfactory in view of the brittleness of the crystals and in light of the lack of precision available. In addition, it has been attempted to pack such crystals between stiff faces and to apply the force to be measured between the parallel surfaces. This arrangement has low efficiency and is likewise lacking in precision.

It is an object of this invention to provide a pressure gage of high sensitivity which is adapted to precisely detect and record small pressures and small pressure variations.

It is a further object of this invention to provide a pressure gage which is particularly suitable for the detection and measurement of forces which generate microseisms.

It is an additional object of this invention to provide a pressure gage wherein at least one anisotropic, piezoelectric, natural or artificial crystal is provided for application of pressure in a manner such that the voltage generated can be efficiently and precisely measured, whereby the pressure variations can be accurately determined.

These and other objects of this invention will appear hereinafter, and for purposes of illustration, but not of limitation, a specific embodiment of this invention is shown in the accompanying drawing in which the figure is a vertical section of a pressure gage having the characteristics of this invention.

The present invention generally relates to a pressure gage of high sensitivity. The gage is provided with a pressure chamber and an anisotropic, piezoelectric crystal is disposed within the chamber. Means are provided for detecting the voltage induced by said crystal as a result of changes in pressure within the chamber.

More specifically, the pressure gage of this invention includes a first chamber which is filled with a gasless liquid which is inert at the temperatures and pressures of use. An elastic membrane covers the chamber and is exposed whereby pressure can be transmitted to the liquid within the chamber. Disposed within the liquid there is provided at least one piezoelectric element.

The gage includes a second chamber filled with a fluid under pressure, the respective chambers being sealed with respect to each other. Electrical conductors are provided for contact with the crystals in the first chamber and the conductors are adapted to pass into the second chamber for transmission of the voltage differentials resulting from pressure changes. Connected to the electrical conductors in the second chamber are means for detecting the voltage changes and measuring and recording means can also be disposed within this chamber. The means disposed within said second chamber preferably include an electrometer tube and a condenser for determining the time constant of the apparatus. A measuring or recording volt meter connected with the electrometer tube, either directly or through a device with low impedance, can thus be provided for achieving the objects of this invention.

The instrument above described is capable of determining and measuring the disordered, periodical, weak and closely spaced pressure waves produced by the ocean conditions noted. The above described instrument can be immersed into the oceans or seas at a depth sufficient to accurately measure the so-called second term effect.

The drawing illustrates an instrument having the characteristics above noted. This instrument includes a housing 1 which is closed at the top by a cover 2. The cover is provided with openings 3 for communication with the pressure exerting media. A second cover 4 is provided at the bottom of the housing and a plug 5 is fitted into the second cover to provide for the intake of feed current and measurement of the output.

The housing is divided into a first chamber 10 and a second chamber 20 which are connected to each other by an opening 8 formed in the wall 7. A crossing insulator 30 is disposed within the opening by means of a fluid-tight mounting.

The upper chamber 10 is divided into two compartments 14 and 15 by means of an elastic membrane 11. The compartment 14 situated above the membrane is adapted to be in direct communication with the pressure exerting medium by means of the openings 3. The lower compartment 15 is filled with a gasless, inert fluid 13, for example, silicon oil, and one or more anisotropic, piezoelectric elements 12 are surrounded by the liquid 13. The elements 12 are seated in the upstanding portion 16 of the wall 7. A plate 17 is recessed at 18 for receiving the upper portion of the crystals 12. Tension springs 19 are fastened to the plate and are secured to the wall 7 at 23 to provide for maintaining the crystals 12 in position. Electric leads 31 are provided for contact with the crystal and the electrode 32.

The lower chamber 20 is filled with a slightly overpressurized fluid 26. Disposed within the chamber are an electrometer tube 21 and a condenser 22, each of which are electrically connected to the electrode 32.

It will be apparent that the crystals 12 are mounted in such a manner that the liquid 13 will be able to transmit to the crystal surfaces any pressure variations detected. The electric loads detected on the exposed surfaces of the block 12 will be transmitted by means of the electrode 32 to the electrometer tube and to the condenser. The condenser will thus be brought, in relation to the mass of the apparatus, to a voltage which is applied to the grid of the electrometer tube. The latter will then be crossed by a current which is applied through a low impedance device such as a cathode follower. With this arrangement, the measuring or recording apparatus can be connected to provide the desired information.

In an illustrative embodiment, a pressure P, the variations of which are to be measured, is transmitted to a liquid within an instrument of the type described. Upon application of this pressure an electric load Q will result, the load being defined as follows:

$$Q = ns(K_1 + 2K_t)P = ns.K_h.P$$

where:

$K_1$ = coefficient along the axis of a piezoelectric disc
$K_t$ = transverse coefficient
$K_h = K_1 + 2K_t$ = global piezoelectric coefficient
$s$ = surface of the piezoelectric disc
$e$ = thickness of the piezoelectric disc
$n$ = number of discs in the block When P varies by $dP$, the corresponding variation $dQ$ of load Q will be:

$$dQ = ns.K_h.dP$$

If $\epsilon$ is the induction power of the material, C the total grid capacitances, $g$ the gain of the impedance adaptor, the sensitivity in volts is:

$$\frac{dV}{dp} = \frac{n.Kh.s}{\frac{n\epsilon s}{4\pi e} + C} \cdot g$$

It will be apparent when considering the above relationship that in order to achieve high sensitivity, it is necessary:

To use a material having a strong piezoelectric coefficient,
To make an assembly of several large surface discs.

The applicant has made use, in an apparatus constructed, of barium titanate discs having 60 mm. diameters.

In the use of the described apparatus for the detection of pressure variations due to microseisms, a large time constant is necessary. In order to achieve this the grid capacitance C is taken as 10,000 picofarads. Therefore, in the above formula, which provides the sensitivity $dV/dP$, the first term of the denominator will become insignificant in view of C and the formula for sensitivity will become:

$$\frac{dV}{dp} = \frac{n.Kh.s}{C} \cdot g$$

In this arrangement, the insulation resistance was superior to $10^{10}$ ohms and the time constant provided was 100 seconds with a sensitivity of 2.5 millivolts per millibarye.

The described apparatus is specially fitted out in order to withstand immersion into the ocean. Such units can be fitted into a box which provides for exposure of the top plate 2. Such a box can contain, in addition to the described apparatus, electric batteries as well as a recording instrument. The recording instrument can alternatively be mounted at the surface whereby the apparatus can be provided with cables for connecting lead wires to the remote recording instrument.

When the apparatus has been lowered into an ocean at depths which may be beyond 500 meters, sea water will penetrate the openings 3 and pressure will be transmitted to the elastic membrane 11 and to the piezoelectric crystals 12. The apparatus will then measure and record the pressure and its variations in accordance with the above described process. The action of the so-called second term effect does not depend on the depth to which the instrument has penetrated, provided the instrument is beyond the point where the first term of the chopping is detectable. Similarly, the instrument is not affected by the distance through which it must pass to reach a suitable depth, since the pressure variations are all relative. It is advantageous to place the apparatus directly on the sea bottom in order to make it integral with the solid base upon which the hammering is proceeding.

Although the use of the apparatus has been described with reference to the detection of forces producing microseisms, it will be apparent that other applications are available. The apparatus of this invention is particularly suitable for the measurement of pressure where high sensitivity is desired even under conditions of extremely high base pressure.

It will be understood that various modifications can be made in the above described pressure gage which will provide the characteristics of this invention without departing from the spirit thereof, particularly as defined in the following claims.

I claim:

1. A pressure gauge which is highly sensitive to fluid pressure changes comprising a rigid housing, a rigid separating wall dividing the housing into a first compartment and a second compartment, a flexible diaphragm dividing the first compartment into a sealed inner chamber and an outer chamber which is exposed to the fluid in which changes in pressure are to be measured, flat isotropic, piezoelectric crystals stacked in the sealed chamber, means connecting the crystals one to the other in parallel, a gas-free inert liquid filling the sealed chamber and surrounding the stacked piezoelectric crystals to engage the stacked crystals substantially throughout their outer surfaces, said second compartment comprising a sealed compartment, means within the second compartment for amplifying the voltages generated in said crystals by reason of variations in pressure of the fluid and including an electrometer tube and a condenser, electrical connectors joining the crystals with the condenser and the electrometer tube in parallel and a connector in the electrometer for power input and read-out of the device.

2. A pressure gauge as claimed in claim 1 which includes a pressure fluid filling the second sealed compartment.

3. A pressure gauge as claimed in claim 1 in which the gas-free inert liquid filling the sealed chamber is an organo silicon oil.

References Cited by the Examiner

UNITED STATES PATENTS

| | | |
|---|---|---|
| 1,776,009 | 9/30 | Rieber. |
| 2,283,285 | 5/42 | Pohlman _____ 340—10 XR |
| 2,569,987 | 10/51 | Frondel _____ 73—398 X |
| 2,571,899 | 10/51 | Kroft et al. _____ 73—71.4 X |
| 2,783,449 | 2/57 | Loofbourrow _____ 340—17 |

RICHARD C. QUEISSER, *Primary Examiner.*

DAVID SCHONBERG, *Examiner.*